United States Patent
Bauchot et al.

(10) Patent No.: US 7,178,098 B2
(45) Date of Patent: Feb. 13, 2007

(54) METHOD AND SYSTEM IN AN ELECTRONIC SPREADSHEET FOR HANDLING USER-DEFINED OPTIONS IN A COPY/CUT—PASTE OPERATION

(75) Inventors: Frederic Bauchot, St Jeannet (FR); Albert Harari, Nice (FR); Benoit Sirot, St Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 1030 days.

(21) Appl. No.: 09/838,424

(22) Filed: Apr. 19, 2001

(65) Prior Publication Data

US 2002/0007380 A1    Jan. 17, 2002

(30) Foreign Application Priority Data

Jul. 13, 2000  (FR)  .................. 00480057

(51) Int. Cl.
*G06F 17/00* (2006.01)
*G06F 15/00* (2006.01)

(52) U.S. Cl. ..................... 715/503; 715/530
(58) Field of Classification Search .......... 715/503, 715/504, 538, 530
See application file for complete search history.

(56) References Cited

U.S. PATENT DOCUMENTS

| | | | | |
|---|---|---|---|---|
| 5,231,577 A | * | 7/1993 | Koss | 715/504 |
| 5,280,575 A | * | 1/1994 | Young et al. | 715/504 |
| 5,359,729 A | * | 10/1994 | Yarnell et al. | 707/2 |
| 5,371,675 A | * | 12/1994 | Greif et al. | 715/503 |
| 5,418,902 A | | 5/1995 | West et al. | |
| 5,499,180 A | * | 3/1996 | Ammirato et al. | 715/503 |
| 5,504,848 A | | 4/1996 | Yamada et al. | |
| 5,598,519 A | * | 1/1997 | Narayanan | 715/504 |
| 5,603,021 A | | 2/1997 | Spencer et al. | |
| 5,604,854 A | * | 2/1997 | Glassey | 715/503 |
| 5,613,131 A | * | 3/1997 | Moss et al. | 715/509 |
| 5,623,282 A | | 4/1997 | Graham et al. | 345/121 |

(Continued)

FOREIGN PATENT DOCUMENTS

EP    0312480 A2    4/1989

(Continued)

OTHER PUBLICATIONS

"Formulas and Logic Downloads", www.xl-logic.com/pages/formulas.html, downloaded by Examiner on Jun. 17, 2003.*

(Continued)

*Primary Examiner*—Shahid Alam
*Assistant Examiner*—Robert Stevens
(74) *Attorney, Agent, or Firm*—Stephen J. Walder, Jr.; David A. Mims, Jr.

(57) ABSTRACT

An example of a solution provided here comprises defining one or more combinations of options, defining an operation to execute (e.g. copy and paste, or cut and paste), computing the content of each cell within the source cell range according to the options, creating a version instance of the destination cell range, and copying the source range of cells into the version instance. Each of the options is defined as a boolean variable, which can be set as "True" or "False," and impact the content of a cell within an electronic spreadsheet.

20 Claims, 12 Drawing Sheets

U.S. PATENT DOCUMENTS

| | | | |
|---|---|---|---|
| 5,701,499 | A | 12/1997 | Capson et al. |
| 5,708,827 | A | 1/1998 | Kaneko et al. |
| 5,713,020 | A | 1/1998 | Reiter et al. |
| 5,806,078 | A * | 9/1998 | Hug et al. .................. 715/511 |
| 5,819,293 | A | 10/1998 | Comer et al. |
| 5,848,393 | A * | 12/1998 | Goodridge et al. ............ 705/8 |
| 5,881,381 | A | 3/1999 | Yamashita et al. |
| 5,883,623 | A * | 3/1999 | Cseri .......................... 715/866 |
| 5,893,087 | A * | 4/1999 | Wlaschin et al. .............. 707/3 |
| 5,983,268 | A * | 11/1999 | Freivald et al. ............. 709/218 |
| 5,987,481 | A * | 11/1999 | Michelman et al. ........ 715/503 |
| 6,055,548 | A | 4/2000 | Comer et al. |
| 6,057,837 | A * | 5/2000 | Hatakeda et al. ........... 715/765 |
| 6,282,551 | B1 * | 8/2001 | Anderson et al. ........... 715/503 |
| 6,327,592 | B1 | 12/2001 | Yoshikawa |
| 6,438,565 | B1 * | 8/2002 | Ammirato et al. .......... 715/503 |
| 6,496,832 | B2 * | 12/2002 | Chi et al. .................... 707/102 |
| 6,640,234 | B1 * | 10/2003 | Coffen et al. ............... 715/538 |
| 6,701,485 | B1 | 3/2004 | Igra et al. |
| 6,948,154 | B1 * | 9/2005 | Rothermel et al. ......... 717/128 |
| 2001/0049699 | A1 * | 12/2001 | Pratley et al. ............. 707/503 |
| 2002/0038303 | A1 * | 3/2002 | Gelfand ...................... 707/100 |
| 2002/0091728 | A1 | 7/2002 | Kjaer et al. |

FOREIGN PATENT DOCUMENTS

EP          0786724 A1    7/1997

OTHER PUBLICATIONS

Blood, Aaron T., "cond_sum_array SpreadSheet", Jan. 6, 2000 (www.XL-Logic.com).*

Blood, Aaron T., "equal_val SpreadSheet", Aug. 10, 2000 (www.XL-Logic.com).*

Blood, Aaron T., "option_box SpreadSheet", Jul. 16, 1999 (www.XL-Logic.com).*

Blood, Aaron T., "same_or_diff SpreadSheet", Sep. 1, 1999 (www.XL-Logic.com).*

Blood, Aaron T., "sum_between_switches SpreadSheet", Sep. 3, 1999 (www.XL-Logic.com).*

Blood, Aaron T., "sum_if SpreadSheet", Aug. 19, 1999 (www.XL-Logic.com).*

Friedman et al., Problem Solving, Abstraction, and Design Using C++, 2nd Edition, Addison-Wesley, Jun. 1997, pp. 165-167, 406-412, and 540-543.*

Gold et al., The Complete Idiot's Guide to Microsoft Excel 97, 2nd Edition, Que Corporation, pp. 53-62 (© 1998).*

Granel, Vincent, "The Xxl Spreadsheet Project", Linux Journal, vol. 1999, issue 60es (Apr. 1999), ISSN: 1075-3583. (http://delivery.acm.org/10.1145/330000/327756/a27-linux_journal_staff.html?key1=327756&key2=5612137801&coll=ACM&dl=ACM&CFID=22784040&CFTOK.*

Jamsa et al., Jamsa's C/C++ Programmer's Bible : The Ultimate Guide to C/C++ Programming, Jamsa Press, Houston, TX, sections 87106, 1161, 1162, 1228 and 1229 (© 1998).*

Microsoft Press Computer Dictionary, 3rd Edition, Microsoft Press, Redmond, WA, 1997, pp. 126 and 299.*

Shaw, Susan M. (editor), Using 1-2-3 Release 2.4, Special Edition, Que Corporation, (c) 1992, pp. 54-56, 77-79, 141, 142 and 270-274.*

"Spreadsheet Programming: The New Paradigm in Rapid Application Development", Knowledge Dynamics, Inc., © 2002 (www.KnowledgeDynamics.com).*

Deitel, H. M., et al., C++: How To Program, 2nd Edition, Prentice Hall, Upper Saddle River, NJ, © 1994, pp. 10, 106-110, 147, 243-244, 256-262, 448, 473-479, 483-485, 707-730, 981-987 amd 1043-1045.*

Kelly, Julia, Using Microsoft Excel 97, 3rd Edition, Que Corp., Indianapolis, IN, © 1998, pp. 124-131, 138-144, 154-189, 209-210 and 337-343.*

Microsoft Computer Dictionary, 4th Edition, Microsoft Press, Redmond, WA, © 1999, pp. 29, 56-58, 79, 229, 272, 420 and 434.*

Hergert, Douglas, Mastering 1-2-3® 97 Edition for Windows® 95, Sybex Inc., San Francisco, CA, © 1997, pp. 123-127, 130-147, 248-267, 277-279, 436-489, 615-621, 664-666 and 672-674.*

"Clipboard Mechanism for Exchanging Attributes", IBM Technical Disclosure Bulletin, IBM Corporation, vol. 38, No. 10, Oct. 1, 1995, pp. 21-22.

Kernighan et al., The C Programming Language, p. 41, Prentice-Hall, Inc., Englewood Cliffs, NJ, © 1978.

Kelly, Julia, Using Microsoft Excel 97, 3rd Edition, pp. 118-122, Que Corp., Indianapolis, IN, © 1998.

Microsoft Press Computer Dictionary, 3rd Edition, pp. 30, 133 and 399, Microsoft Press, Redmond, WA, © 1997.

* cited by examiner

FIG. 2A-1

| | A | B | C | D | E | F | G | H |
|---|---|---|---|---|---|---|---|---|
| 1 | | Jan | Feb | Mar | Apr | May | Jun | Total |
| 2 | Europe | 100 | 110 | 150 | 140 | 150 | 160 | 810 |
| 3 | Asia | 45 | 40 | 60 | 60 | 65 | 70 | 340 |
| 4 | Americas | 145 | 145 | 185 | 175 | 200 | 190 | 1040 |
| 5 | Total | 290 | 295 | 395 | 375 | 415 | 420 | 2190 |
| 6 | | | | | | | | |
| 7 | | | | | | | | |
| 8 | | | | | | | | |
| 9 | | | | | | | | |

METHOD AND SYSTEM IN AN ELECTRONIC SPREADSHEET FOR HANDLING USER-DEFINED OPTIONS IN A COPY/CUT—PASTE OPERATION

TECHNICAL FIELD OF THE INVENTION

The present invention relates to the field of information processing by digital computers, and more particularly to a method and system, in an electronic spreadsheet, for handling user-defined options during a copy and paste operation, or during a cut and paste operation.

BACKGROUND ART

Before computers, numerical analyses, particularly financial ones, were usually prepared on an accountant's columnar pad or spreadsheet, with pencil and calculator in hand. By organising data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerised replacement for the traditional financial modelling tools: the accountant's columnar pad, pencil, and calculator. In some regards, spreadsheet programs are to those tools what word processors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, a letter to each column, and another letter to each sheet (or page) of the spreadsheet. To reference a location at column A and row 1 of the second page (i.e., the upper-left hand corner), for example, the user types in "B:A1". In this manner, the spreadsheet defines an addressable storage location or "cell" at each intersection of a row with a column within a given page.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. Such spreadsheet cells can also be defined and named as a range as long as they are arranged as a convex set of cells. A typical example of such a named range simply corresponds to a regular table found in an accountant's pad. In this fashion, range names can serve as variables in an equation, thereby allowing precise mathematical relationships to be defined between cells. The structure and operation of a spreadsheet program, including advanced functions such as functions and macros, are documented in the technical, trade, and patent literature. For an overview, see e.g., Cobb, S., *Using Quattro Pro* 2, Borland-OsbomeIMcGraw-Mll, 1990; and LeBlond, G. and Cobb, D., *Using* 1-2-3, Que corp., 1985. The disclosures of each of the foregoing are hereby incorporated by reference.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what-if" scenarios. After a set of computational relationships has been entered into a worksheet, thanks to imbedded formulas for instance, the information can be recalculated using different sets of assumptions. The result of each recalculation appears almost instantaneously. Performing this operation manually, with paper and pencil, would require recalculating every relationship in the model with each change made. Thus, electronic spreadsheet systems were invented to solve "what-if" problems, that is, changing an input and seeing what happens to an output.

"What-if" problems can be formally represented by the definition of one or several user-defined options, each of them representing an assumption which can either be set as "TRUE" or "FALSE". The effect of a single given user defined option can take different forms and requires that the spreadsheet user formally represents this effect thanks to different spreadsheet built-in means. With current spreadsheet technology, such spreadsheet means can be based on the writing of spreadsheet formulas (requiring thus some in-depth knowledge of the formula language and syntax), or can also be based on the utilisation of so-called versions. In both cases, there are several limitations which can turn these spreadsheet means into inefficient and error-prone solutions.

When relying on spreadsheet formulas, the user needs first to master the spreadsheet formula language, something which is by far not an easy task for somebody not used to programming languages. Then the user must define by himself some formal representation of the user-defined options, with the associated means for managing them: this second task is even more difficult as the user cannot rely on any stringent set of rules (as the ones implemented in a language compiler or interpreter) to determine if his work is error-free. Furthermore an electronic spreadsheet prepared by a given user with his or her own way of representing options will be difficult to be used by another user if the latter has not received precise instructions from the former on the way to handle the options. In short, unless mastering advanced programming skills, it is virtually impossible for a regular spreadsheet user to realise and share error-free "what-if" scenario thanks to user-defined options, by solely relying on the spreadsheet built-in formula language.

Current spreadsheet tools implement today the concept of versions and version groups, which represent some advantages with respect to the previous approach. Nevertheless using versions presents also some limitations, as outlined hereafter.

Let first recall the concept of versions, according to the following description found in the on-line help of the 1-2-3 spreadsheet tool from Lotus Corporation. "Versions are sets of different data for the same named range. Each version has a name, a date and time of creation and modification, and the name of the person who created or last modified the version. You can also assign styles and protection settings to a version and attach a comment. For example, you can name a range Revenues and create three versions of the range:

HighRev, with values of 600, 500, 400, and 300; MedRev, with values of 500, 400, 300, and 200; and LowRev, with values of 400, 300, 200, and 100. You can create versions of any named range. For example, as well as creating versions of Revenues, you might name another range Expenses and create versions named HighExp, MedExp, and LowExp. When you create versions for a named range, all the versions are stored in the cells of the range. 1-2-3 calculates using the values in the currently displayed version. Any style or data changes you make to cells update the version within that range automatically."

Once a range of cell is versionned, the user can defined several versions for this range. In the classical case where multiple options must be managed, the number of versions to be defined may become excessive. Indeed if an electronic spreadsheet must address a set of N independent options, any cell whose content depends on these N options should be represented with $2^N$ versions, each of them corresponding to a given combination of these N options. Besides the resulting increase in file and memory storage (leading to degraded performances), this situation may become almost unmanageable for the user, specially in the case where multiple dispersed cells are versionned, even with the concept of version groups allowing to associate versions on different ranges of cells.

Thanks to a concept of Option_Manager and to a concept of Option_Applicator, it is possible to alleviate the above mentioned limitations and to easily define, manage and apply options within spreadsheets. The user first defines the user-defined options he/she needs for his/her own needs, then the user can apply one or several of these user-defined options to one or several given spreadsheet cells. By managing later on the different user-defined options introduced in the spreadsheet (in other words, by changing the user-defined options between the 'TRUE' and 'FALSE' values), the user can easily and instantaneously understand the impact of each user-defined option on the various cells.

If afterwards the user wishes to copy and paste or to cut and paste a source range of cells from the current spreadsheet to a destination range of cells, a problem may arise if the user-defined options defined in the source environment are not defined in the destination environment. For instance, this situation can happen if the destination range of cells and the source range of cells belong to a different file. In this a case, the dependency on the user-defined options is lost and the conventional spreadsheet tools realising the copy and paste or cut and paste operation can either end up with erroneous results, or with partial results. Indeed if the copy and paste or cut and paste operation is done "by value", then each destination cell within the destination range of cells will receive the current value of the corresponding cell within the source range of cells, but all the information carried by the user-defined options will be lost. Indeed the formula translating how the user-defined options impact the content of a source cell is just replaced within the corresponding destination cell by the value it takes (with the current set of values of the user-defined options), so that any later modification of the value of any user-defined option will no longer impact the content of the destination cell. Alternatively, if the copy and paste or cut and paste operation is simply done by content, then the cell within the destination range of cells will show an 'ERR' result as its content points to user-defined options which cannot be resolved as soon as the context of the source range of cells becomes invisible from the context of the destination range of cells. The present invention resolves this problem by allowing the spreadsheet user to preserve, within the destination range of cells, the dependency on the user-defined options even if the destination and the source range of cells do not belong to the same context (for instance if they are not within the same spreadsheet file).

SUMMARY OF THE INVENTION

The present invention relates to the field of information processing by digital computers, and more particularly to a method and system, in an electronic spreadsheet, for handling user-defined options during a copy/cut—paste operation when the source range of cells comprises one or a plurality of cells with user-defined options and when the destination environment does not necessarily defines the same user-defined options as the ones defined in the source environment. The method of handling user-defined options during a copy and paste or a cut and paste operation comprises the steps of:

defining one or a plurality of combinations, each combination comprising one or a plurality of options;
    defining a source cell range and a destination cell range;
    defining an operation to execute, either copy and paste, or cut and paste;

for each defined option combination comprising one or a plurality of options, if at least one cell in the source cell range comprises a reference to said one or plurality of options,
    computing the content of each cell within the source cell range according to said one or plurality of options;
    creating a version instance of the destination cell range;
    copying the source range of cells into said version instance.

when the last option combination is copied,
    clearing the source cell range if the operation is cut and paste.

In a particular embodiment, the method comprises the further steps of:
    defining a name for each defined combination of options;
    naming the version instance with the defined combination name.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

DETAILED DESCRIPTION OF THE PREFERRED EMBODIMENT

System Hardware

Figure 1A:
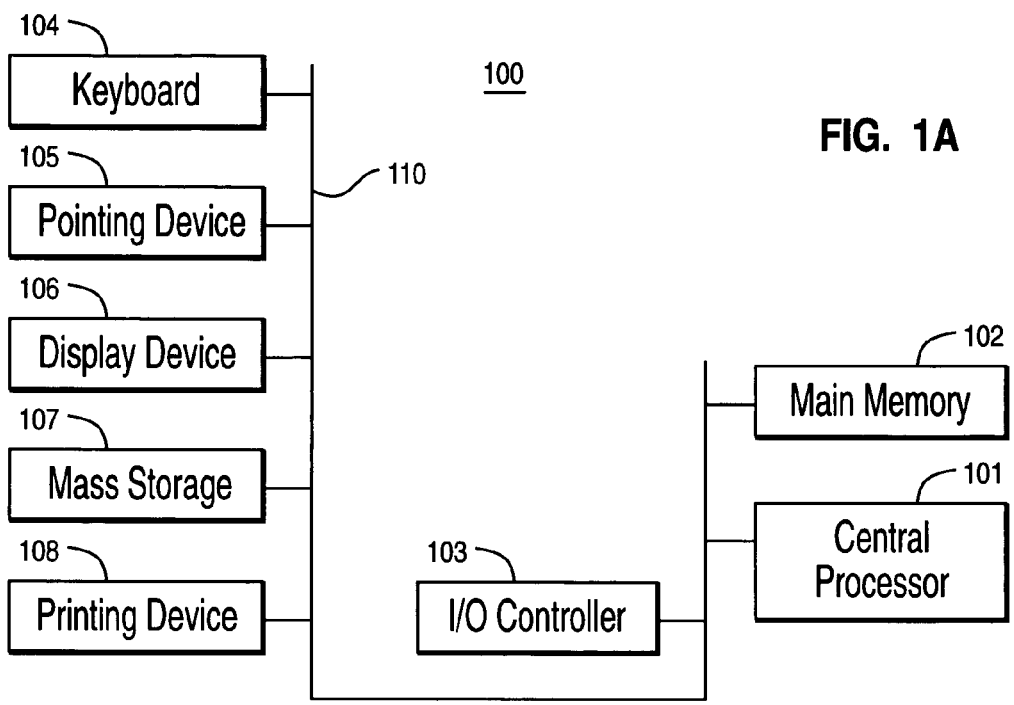
FIG. 1A is a block diagram of a computer system in which the present invention may be embodied.
Figure 1B:
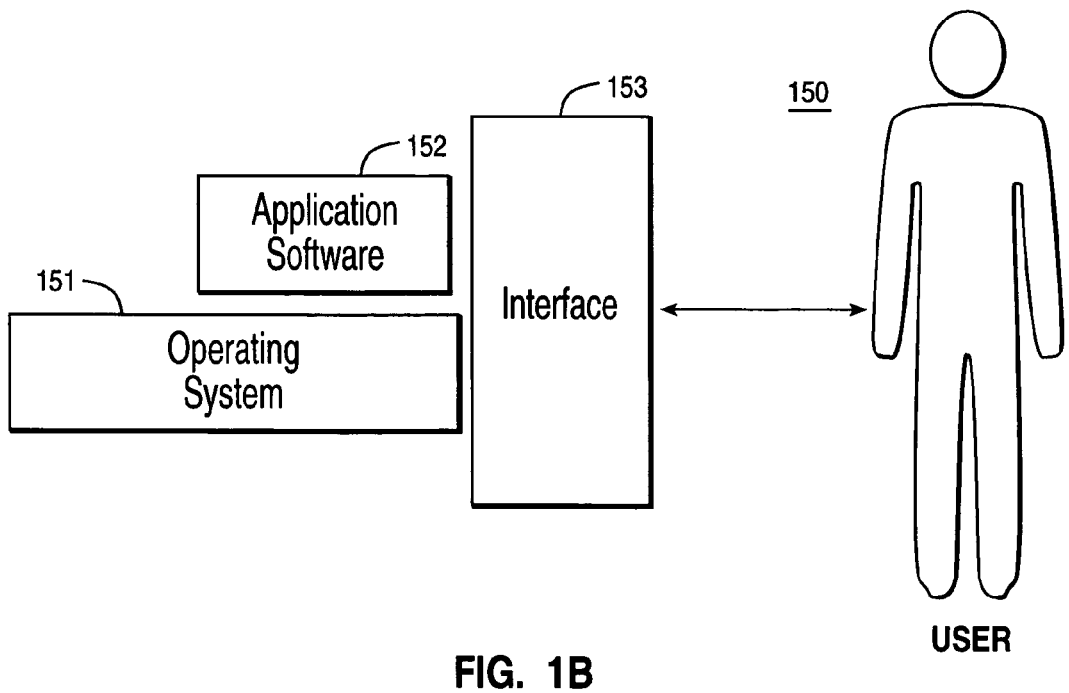
FIG. 1B is a block diagram of a software system including an operating system, an application software, and a user interface for carrying out the present invention.

As shown in FIG. 1A, the present invention may be embodied on a computer system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including International Business Machine—IBM Corporation of Armonk, N.Y.).

Illustrated in FIG. 13, a computer software system 150 is provided for directing the operation of the computer system 100. Software system 150, which is stored in system memory 102 and on disk memory 107 (each of which and their equivalents, may be considered computer usable media), includes a kernel or operating system 151 and a shell or interface 153. One or more application programs, such as application software 152, may be "loaded" (i.e., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which is preferably a graphical user interface (GUI), also serves to display results, whereupon the user may supply additional inputs or terminate the session. In a preferred embodiment, operating system 151 and interface 153 are Microsoft Win95, available from Microsoft Corporation of Redmond, Wash. Application module 152, on the other hand, includes a spreadsheet notebook of the present invention as described in further detail herein below.

Interface

A. Introduction

The following description will focus on the presently preferred embodiments of the present invention, which are embodied in spreadsheet applications operative in the Microsoft Win95 environment. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, NextStep, and the like. Therefore, the description of the exemplary embodiments which follows is for purposes of illustration and not limitation.

Figures 1, 1C:
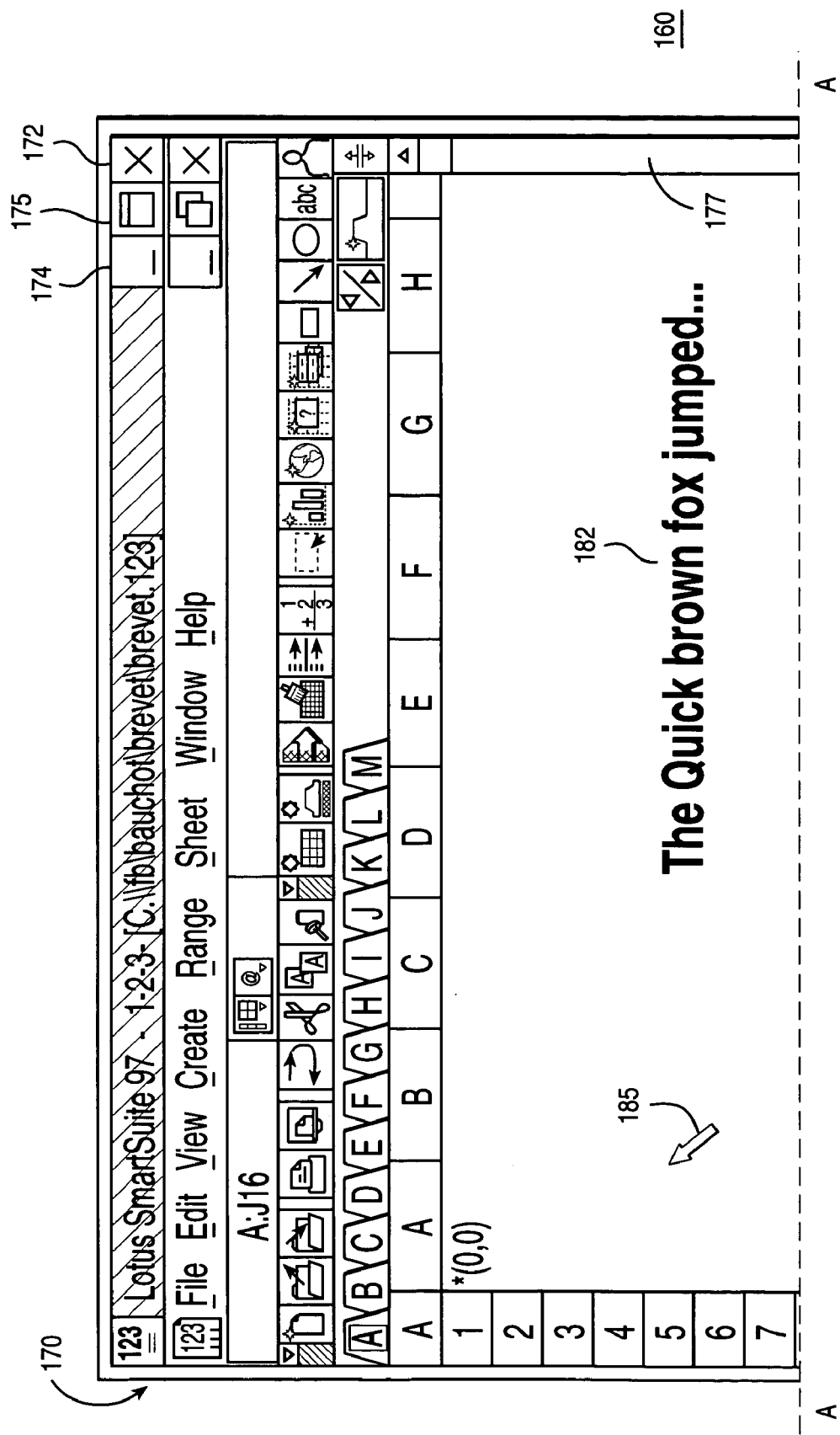
FIG. 1C illustrates the basic architecture and functionality of a graphical user interface in which the present invention may be embodied.
Figures 1, 1C, 2:
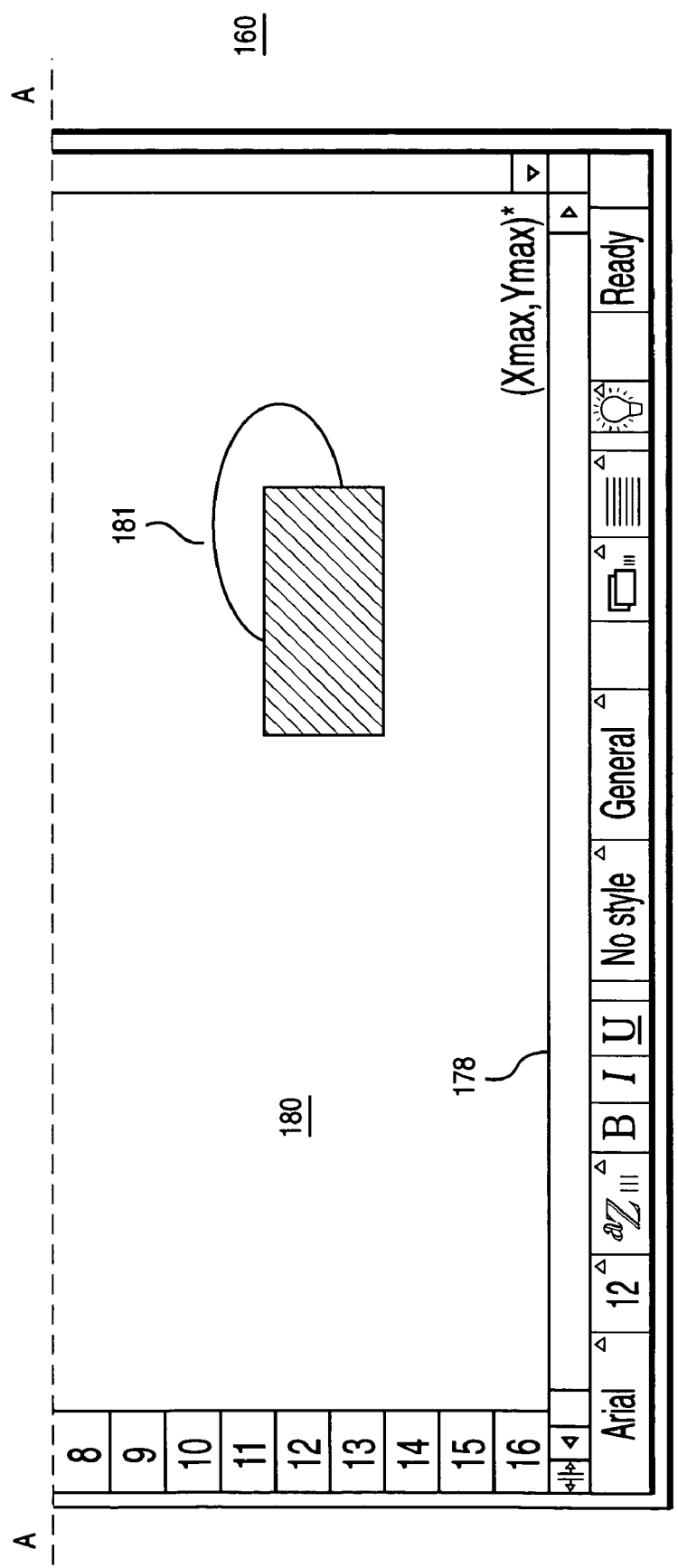

Referring now to FIG. 1C, the system 100 includes a windowing interface or workspace 160. Window 160 is a rectangular, graphical user interface (GUI) for display on screen 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within the computer system 100.

Windowing interface 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 160 may be closed, re-sized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., *Microsoft Mouse Programmer's Reference*, Microsoft Press, 1989. The general construction and operation of a GUI event-driven system, such as Windows, is also known in the art: see, e.g., Petzold, C., *Programming Windows*, Second Edition, Microsoft Press, 1990. The disclosures of each are hereby incorporated by reference.

B. Preferred Interface

Figures 2, 2A:
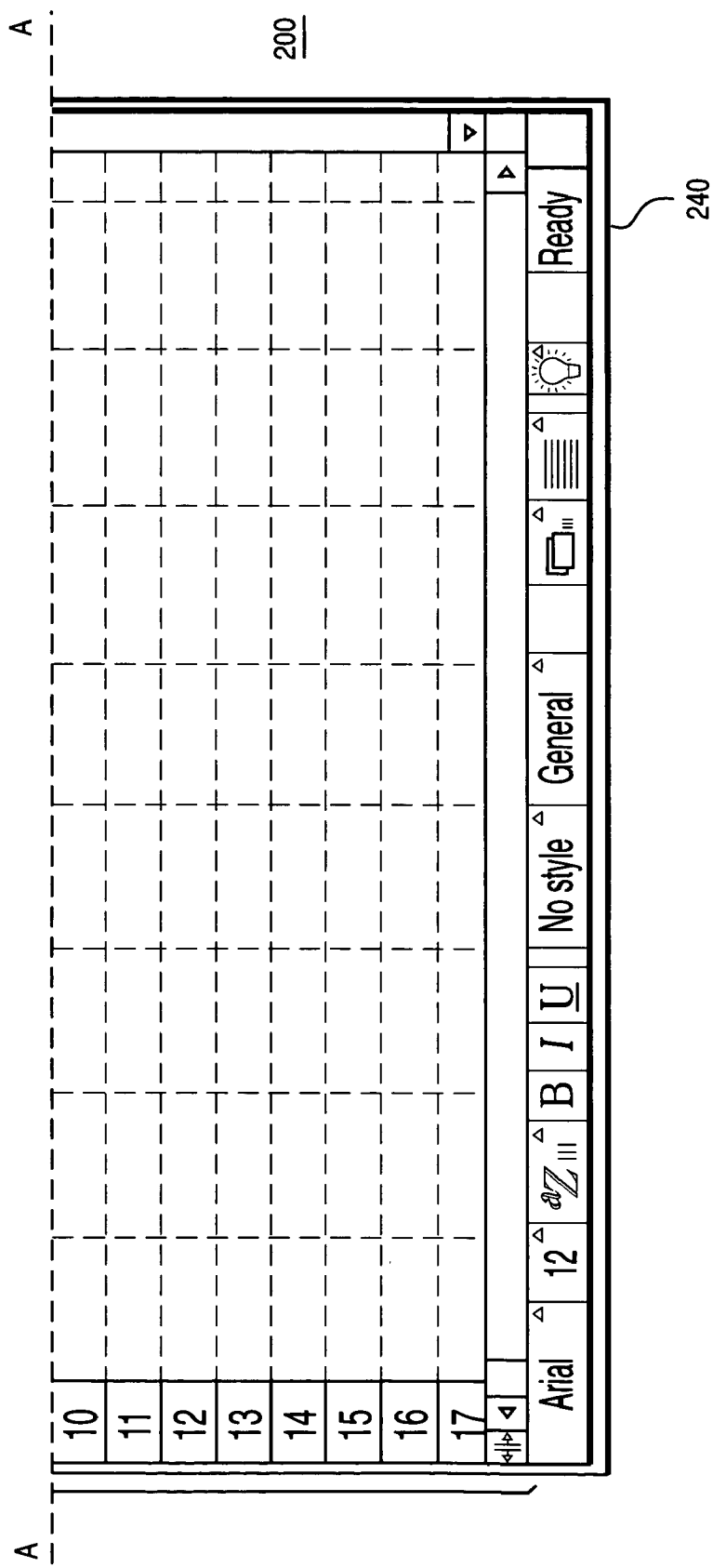
FIG. 2A shows a spreadsheet notebook interface according to the preferred embodiment of the present invention.

Shown in FIG. 2A, a spreadsheet notebook interface of the present invention will now be described The spreadsheet notebook or workbook of the present invention includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window 250. The menu bar 210 displays and invokes, in response to user inputs, a main level of user commands. Menu 210 also invokes additional pull down menus, as is known in windowing applications. Input line 231 accepts user commands and information for the entry and editing of cell contents, which may include data, formulas, macros, and the like.

Indicator 230 displays an address for the current cursor (i.e., active cell) position, or the address or name of a selected named range (i.e. active selection). At the status line 240, system 100 displays information about the current state of the workbook; for example, a "READY" indicator means that the system is ready for the user to select another task to be performed.

Figure 2B:
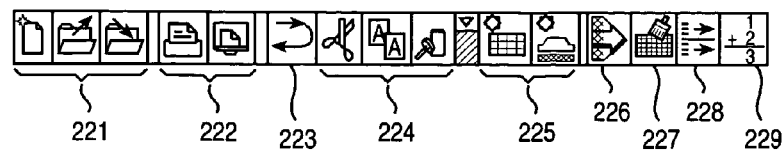
FIG. 2B shows the toolbar component of the notebook interface shown in FIG. 2A.

The toolbar 220, shown in further detail in FIG. 2B, comprises a row or palette of tools which provide a quick way for the user to choose commonly-used menu commands or properties. In an exemplary embodiment, toolbar 220 includes file manipulation buttons 221, printing buttons 222, an undo button 223, cut, copy, and paste buttons 224, information pop-up window buttons tool 225, a named range selection button 226, a style copy button 227, a column re-sizing button 228, and a sum button 229. The functions of these buttons are suggested by their names. For instance, buttons 224 cut, copy and paste data and objects to and from Windows' clipboard. The same actions are also available as corresponding commands in the Edit menu (available from menu bar 210).

The notebook, which provides an interface for entering and displaying information of interest, includes a plurality of spreadsheet pages. Each page may include conventional windowing features and operations, such as moving, re-sizing, and deleting. In a preferred embodiment, the notebook includes 256 spreadsheet pages, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a 2-D spread. Page A from the notebook 200, for example, includes a grid in row and column format, such as row 3 and column F. At each row/column intersection, a box or cell (e.g., cell C4) is provided for entering, processing, and displaying information in a conventional manner. Each cell is addressable, with a selector being provided for indicating a currently active one (i.e., the cell that is currently selected).

Figure 2C:
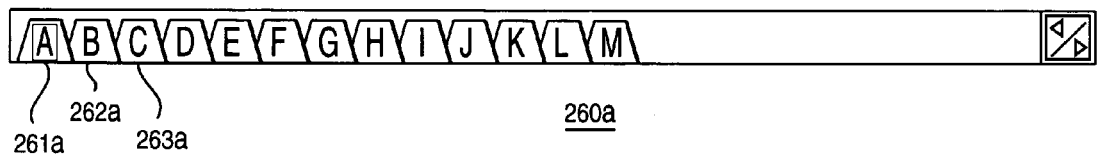
FIGS. 2C and 2D show page identifiers for rapidly accessing and manipulating individual pages of the notebook interface shown in FIG. 2A.
Figure 2D:
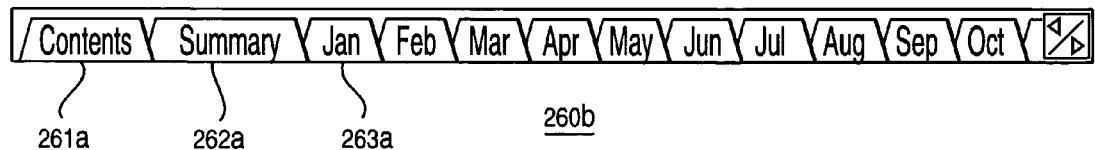

As shown in FIGS. 2C–D, individual notebook pages are identified by page identifiers 260, preferably located along one edge of a notebook. In a preferred embodiment, each page identifier is in the form of a tab member (e.g., members 261a, 262a, 263a) situated along a top edge of the notebook. Each tab member may include representative indicia, such as textual or graphic labels, including user selected titles representing the contents of a corresponding page. In FIG. 2C, the tab members 260 are set to their respective default names. For example, the first three tab members (members 261a, 262a, 263a) are respectively set to A, B, and C. Tab members are typically given descriptive names provided by the user, however. As shown in FIG. 2D, for example, the first three tab members have now been set to "Contents" (tab member 261b), "Summary" (tab member 262b), and "Jan" (tab member 263b). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers serve aid in the entry of spreadsheet named range addresses. For example, when entering a formula referring to a named range of cells on another page, the user may simply use the descriptive page name in the named range address, thus making it easier for the user to understand the relationship of the cell(s) or information being referenced.

A general description of the features and operation of the spreadsheet notebook interface may be found in Quattro Pro for Windows (*Getting Started, User's Guide and Building Spreadsheet Applications*), available from Borland International.

Management of User-Defined Options

A. Introduction

As the power of spreadsheet environments has increased since several years, it is today possible to develop complex custom applications solely based on spreadsheets, as opposed to applications developed with general purpose programming languages like C++ or VisualBasic from Microsoft Corporation. This can be achieved thanks to spreadsheet imbedded tools such as macro languages, script languages, formulas and versions. In typical spreadsheet based applications, it is common to find individual cells or ranges of multiple cells whose content depends on one or several conditions. Running "what-if" scenario can therefore be seen as applying different sets of conditions to such condition dependent cells. With conventional electronic spreadsheet tools, this can be achieved thanks to the concept of version. A version is always associated to a range of cells (whether it contains a single cell or multiple cells) and can be seen as a set of mutually exclusive instances of this range of cells. When multiple independent conditions have to be taken into account for running the "what-if" scenario, the resulting number of versions to be defined varies exponentially with the number of conditions. Indeed with N independent assumptions, there are $2^N$ different combinations of these N assumptions. With N only equal to 7, $2^N$ is already equal to 128. Thus even with a small number of conditions, there is a quite larger number of combinations, which can easily reach the limit of the spreadsheet. Furthermore when different cells dispersed within an electronic spreadsheet depend on the same set of conditions, conventional electronic spreadsheet tools propose to use the concept of version groups. Version groups require from the spreadsheet user a careful definition of the dependencies between versions of different cell ranges.

The present invention offers a user-friendly solution to this problem by defining a method and a system for managing and applying user-defined options to a given cell. When the spreadsheet user has to perform a copy and paste or a cut and paste operation on a source range containing cells where user-defined options are applied, conventional tools present severe limitations if the destination range belongs to a context where the user defined-options applied to the source range are not visible. The present invention provides a user-friendly solution tot his problem by defining a method and a system for handling user-defined options during a copy and paste or a cut and paste operation.

In the next sections, the above-mentioned conditions will be referred to as options. An option is defined as a boolean variable, which can be set as "True" or "False" and which may impact the content of any given cell within an electronic spreadsheet, by referencing it just as a conventional named range. For instance the formula "$baseprice *(1-10%*$discount)" refers on one hand to a conventional named range "baseprice" and on the other hand to a named range "discount" which is also defined as an option according to the present invention. In this example, when the option "discount" is "false" (with option value "false" conventionally set to 0), the formula takes the same value as the one contained in the named range "baseprice". Alternatively, when the option "discount" is "true" (with option value "true" conventionally set to 1), the formula results in a value equal to the value of the named range "baseprice", decreased by 10%.

In the following sections, a cell where one or several user-defined options are applied will be referred to as an "Option Active Cell" or OAC.

B. Option Manager, Option Applicator and Option Handler

In contrast to just-described conventional tools, the present invention provides a more powerful, user-friendly and interactive method for managing, applying and handling user-defined options thanks to the following tools:

The "Option Manager" automatically allows the electronic spreadsheet user to define if a given condition deserves to be handled as a so-called Option, and afterwards to manage this option.

The "Option Applicator" automatically allows the user to apply one or several user-defined options to a given spreadsheet cell.

The "Option Handler" allows to safely perform a copy and paste or a cut and paste operation from a source range of cells to a destination range of cells:
  if the source range comprises cells where user defined options are applied, and
  if the user defined options are not visible from the destination range.

In a preferred embodiment, the present invention is used in four steps :

1. The first step occurs when the spreadsheet user decides, based on some criteria not detailed here, if one or several conditions deserve to take advantage of the present invention, that is to be managed as one or several options by the Option Manager.

Option Visualisation

Figure 3:
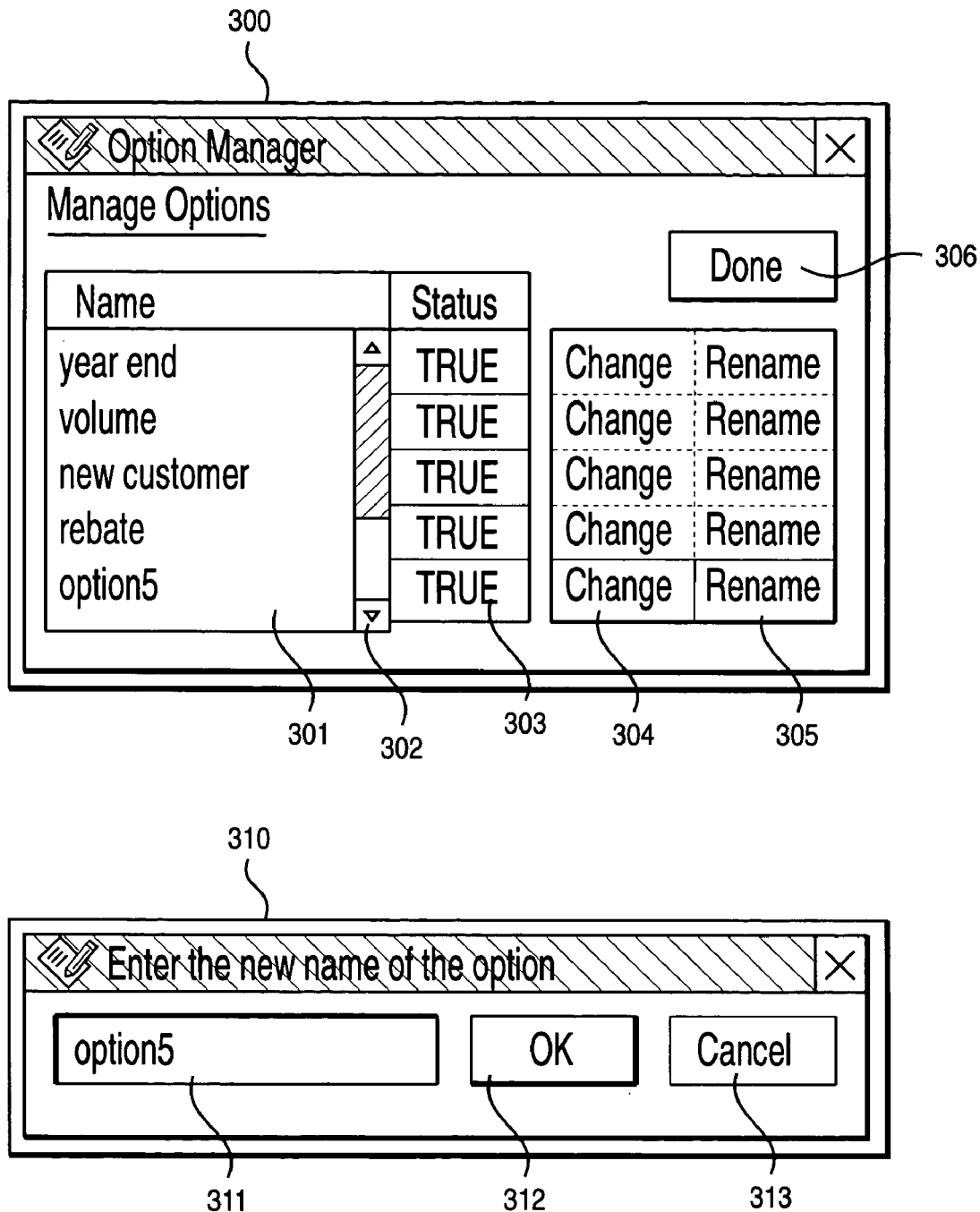
FIG. 3 illustrates a preferred spreadsheet user interface for managing user-defined options, according to the present invention.

The user first invokes a specific command called "Option_Manager" thanks to conventional means available in spreadsheet environment, such as (but not limited to) dedicated push-buttons, keyboard entry short cuts, menu or sub-menu entries. This results in displaying on the Display device 106 an Option Manager Dialog Box 300, as shown by FIG. 3. Within this Option Manager Dialog Box 300, the user can visualise already defined options in the "List Box" 301 (such as the ones named "year end", "volume", "new customer" and "rebate" as shown in FIG. 3), as well as unused options whose names follow some predefined template, such as "option*" where the character "*" is a wild card for representing numbers. In the example shown in FIG. 3, the bottom option within the List Box 301 is named "option5" and therefore corresponds in this preferred embodiment as an unused option. Any other similar or different naming convention may be used without departing from the spirit of this invention. To visualise any other options, whether already defined or spare, not displayed within the list box 301 of the Option Manager Dialog Box 300, the user can for instance use the pointing device 105 to click on the scroll bar 302, so that the list box 301 can move upwards on downwards along the full set of used and spare options.

Option Definition

The user can typically decide to use the first unused option ("option5" as shown in the list box 301 within the Option Manager Dialog Box 300) for becoming the first new used option. For this purpose the user uses the pointing device 105 to click on the push-button "Rename" 305 located on the right of the "option5" element of the list box 301. This result in displaying on the display device 106 a new dialog box 310. Within this dialog box 310, a user entry field 311 allows the user to change with the keyboard 104 the default option name "option5" into a new one. If at that point the user decides, for any reason not detailed here, not to define a new option, it can cancel this operation by clicking on the push-button "Cancel" 313. This will result in closing the dialog box 310 from the display device 106 and then giving back control to the Option Manager dialog box 300. Alternatively, if the user wants to continue with the new option definition, it confirms the operation by clicking on the push-button "OK" 313 within the dialog box 310. This will result in closing the dialog box 310 from the display device 106 and then giving back control to the Option Manager dialog box 300. which now shows in the bottom of the list box 301 the new name of the just specified option. If the user wants to defined other new options, it can follow the same steps as long as spare options are left unused. When done, the user uses the pointing device 105 to click on the push-button "Done" 306. This will result in closing the Option Manager Dialog Box 300 on the display device 106.

2. The second step occurs when the spreadsheet user decides, based on his or her own criteria not detailed here, to take advantage of the present invention by manipulating already defined options thanks to the Option Manager. Such manipulation can either be to rename one or several already defined options, or to read and/or change the status (between the "True" and "False" status) of one or several already defined options.

Dialog Box

In both cases, the user first invokes a specific command called "Option_Manager" thanks to conventional means available in spreadsheet environment, such as (but not limited to) dedicated push-buttons, keyboard entry short cuts, menu or sub-menu entries. This result in displaying on the display device 106 of an Option Manager Dialog Box 300, as shown by FIG. 3.

Option Visualisation

Within this Option Manager Dialog Box 300, the user can visualise already defined options in the "List Box" 301 (such as the ones named "year end", "volume", "new customer" and "rebate" as shown in FIG. 3). To visualise any other defined options possibly not displayed within the list box 301 of the Option Manager Dialog Box 300, the user can for instance use the pointing device 105 to click on the scroll bar 302, so that the list box 301 can move upwards on downwards along the full set of used and spare options.

Option Renaming

If the user choice is to rename one or several already defined options, then he/she has to follow, for each relevant options, a sequence of steps similar to the ones used to initially define a new option. In short it consists in first using the scroll bar 302 to display within the list box 301 the option to rename, then to click on the push-button "Rename" standing on the right of the selected option (as the push-button 305 if the selected option appears at the bottom of the list box 301), then to replace by using the keyboard 104 within the displayed dialog box 310 the current option name displayed in the window 311, and then to click on the push-button "OK" 312.

Read/Change Option Status

If the user choice is to read and/or change the status of one or several defined options, he/she begins as above to display within the list box 301 (possibly by using the scroll bar 302) the first option whose status must be read and/or updated. Once done, the status of this option is shown in the label box sitting immediately on the right of the list box 301. For instance if the currently managed option is the bottom one within the list box 301, then this status information is shown in the label box 303; it can take the values "TRUE" or "FALSE". If the user decides, for any reason not detailed here, to change the current status from "TRUE" to "FALSE" or conversely from "FALSE" to "TRUE", then the user must click with the pointing device 105 on the push-button "Change" 304. The effect of this operation is reflected within the Option Manager Dialog Box 300 by swapping the "TRUE" and "FALSE" values shown in the label box 304. All these steps must be repeated for every option for which the user wishes to read and/or update the status. When done, the user uses the pointing device 105 to click on the push-button "Done" 306. This will result in closing the Option Manager Dialog Box 300 on the display device 106.

3. The third step occurs when the spreadsheet user decides, based on his or her own criteria not detailed here, whether the content of a given cell (referred to as the Option Applied Cell or OAC) must depend or not on a given specified option.

Figures 4, 5:
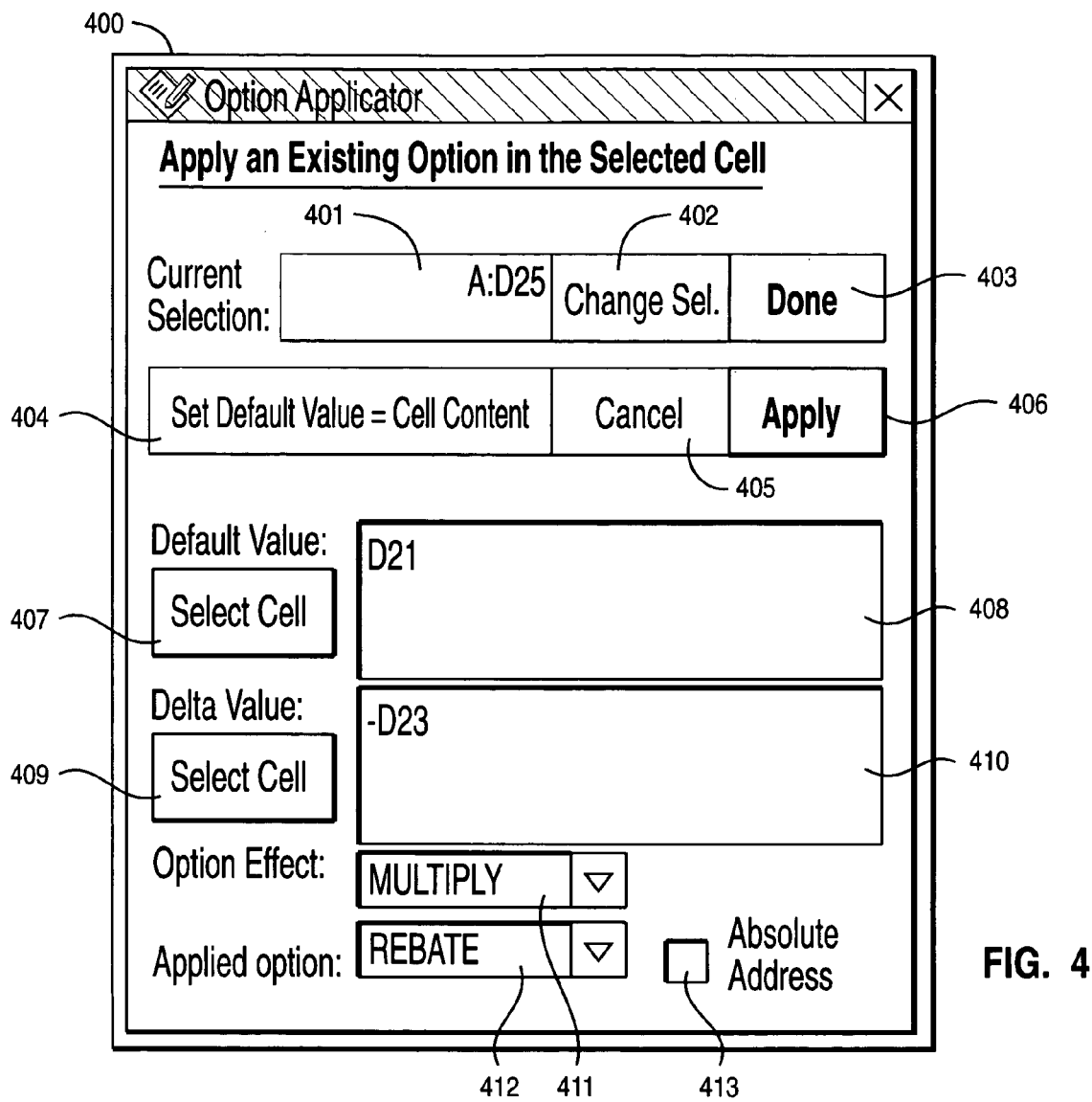
FIG. 4 illustrates a preferred spreadsheet user interface for applying user-defined options within a given cell, according to the present invention.
FIG. 5 illustrates the structure of the Option Combination Table in the preferred embodiment of the present invention.

After having selected the cell where user-defined options must be applied, the user first invokes a specific command called "Option_Applicator" thanks to conventional means available in spreadsheet environment, such as (but not limited to) dedicated push-buttons, keyboard entry short cuts, menu or sub-menu entries. This results in displaying on the display device 106 an Option Applicator Dialog Box 400, as shown by FIG. 4.

Option Effect Combination

Within this Option Applicator Dialog Box 400, the user can visualise if some option has already been applied to the OAC, and if it is the case, which is the option effect. For this purpose, the Option Applicator Dialog Box 400 contains an "Option Effect" combination box 411 showing one of the following possible values:

"NONE" meaning that there is none option applied to the OAC;

"ADD" meaning that one option is applied, with additive effect;

"MULTIPLY" meaning that one option is applied, with multiplicative effect; and

"OR" meaning that one option is applied with exclusive effect.

If the user wishes either to apply a new option, or to modify an existing one, then it has just to use conventional means (such as for instance the pointing device 105 or some short cuts on the keyboard 104) to modify the content of the "Option Effect" combination box 411. Within this Option Applicator Dialog Box 400, the user can also visualise any already applied option to the OAC thanks to the "Applied Option" combination box 412 which displays the option affecting the OAC. The values displayed within the "Applied Option" combination box 412 correspond to the list of user-defined options, as defined and managed by the Option_Manager method. If the user wishes either to change an already applied option, or to specify a new option, then it has just to use conventional means (such as for instance the pointing device 105 or some short cuts on the keyboard 104) to modify the content of the "Applied Option" combination box 412 so that it displays the desired option.

Default Value

Within this Option Applicator Dialog Box 400, the user can also visualise the content of the OAC when the applied option is set to "FALSE". For this purpose, the Option Applicator Dialog Box 400 contains a "Default Value" text box 408 showing the content of the OAC when the applied option is set to "FALSE". In the specific example of FIG. 4, this default value corresponds to the number 10000. If the user wishes to modify this default value, then it has just to use conventional means (such as for instance the pointing device 105 or some short cuts on the keyboard 104) to modify the content of the "Default Value" text box 408 so that it displays the desired modified value. Furthermore, if during this "Default Value" text box 408 update, the user needs to reference a cell or a range within the spreadsheet, then the user can use the pointing device 105 to first click on the "Select Cell" push-button 407, and then to point within the spreadsheet to the desired cell or range of cells which needs to be referenced. This action will result in appending, within the content of the "Default Value" text box 408 the address of the referenced cell or range. This feature is particularly useful when the default value must be specified as the result of some arithmetic between cells or ranges of cells.

Delta Value

Within the Option Applicator Dialog Box 400, the user can also visualise the variation of the content of the OAC (according to the effect specified in the "Option Effect" combination box 411) when the applied option is set to "TRUE". For this purpose, the Option Applicator Dialog Box 400 contains a "Delta Value" text box 410 showing the variation of the content of the OAC when the applied option is set to "TRUE". In the specific example of FIG. 4, this delta value corresponds to the opposite of the content of the cell with address D23. More generally, let D represent the default value, as defined within the "Default Value" text box 408, let $\Delta$ represent the delta value, as defined within the "Delta Value" text box 410 and let E represent the value taken by the applied effect as specified within the "Option Effect" combination box 411. Then if the applied option (as specified within the "Applied Option" combination box 412) is "FALSE", then the value taken by the OAC is equal to D, regardless of the value of E; if the applied option is "TRUE", then the value taken by the OAC is respectively equal to $D+\Delta$, or $D*\Delta$, or $\Delta$ if the value of E is equal to "ADD", or "MULTIPLY", or "OR". If the user wishes to modify the delta value, then it has just to use conventional means (such as for instance the pointing device 105 or some short cuts on the keyboard 104) to modify the content of the "Delta Value" text box 410 so that it displays the desired modified value.

Furthermore, if during this "Delta Value" text box 410 update, the user needs to reference a cell or a range within the spreadsheet, then the user can use the pointing device 105 to first click on the "Select Cell" push-button 409, and then to point within the spreadsheet to the desired cell or range of cells which needs to be referenced. This action will result in appending, within the content of the "Delta Value" text box 410 the address of the referenced cell or range. This feature is particularly useful when the delta value must be specified as the result of some arithmetic between cells or ranges of cells.

Relative/Absolute Cell Reference

Within this Option Applicator Dialog Box 400, the user can also visualise and set if the applied option is referenced as an absolute reference of not. For this purpose, the Option Applicator Dialog Box 400 contains an "Absolute Address"

check box 413 showing either a check mark or a blank field. In the former case, the applied option is referenced as an absolute reference and in the later case, it is referenced as a relative reference. By using conventional means such as the pointing device 105, the user can modify this setting by clicking on the "Absolute Address" check box 413, so that its display swaps between a check mark and a blank field.

Applying/Modifying Option Effect

When the user is ready with either applying a new option effect to an OAC or with modifying an existing option effect to an OAC, the user can 'record' this action by clicking with conventional means such as the pointing device 105, on the "Apply" push-button 406. This results in updating the OAC content so that it contains the new or updated option effect. If the user wishes to apply more than one option within the OAC, the user must repeat the previous steps for each applied option, and furthermore reinitialise the OAC default value as the content of the OAC after having applied each option to the OAC. For this purpose, the Option Applicator Dialog Box 400 contains a "Set Default Value=Cell Content" push-button 404 on which the spreadsheet user can click using conventional means like the pointing device 105. This results in replacing the content of the "Default Value" text box 408 by the content of the OAC, in clearing the content of the "Delta Value" text box 410, and in initialising the "Option Effect" combination box 411 to the value "NONE". When this is done, the OAC still depends on the user-defined actions already specified by the spreadsheet user, as explained above, but now the user can specify a new option, a new effect and a new delta value respectively in
- the "Applied Option" combination box 412,
- the "Option Effect" combination box 411, and
- the "Delta Value" text box 410, as well as specify if this new option is referenced with absolute reference by using the "Absolute Address" check box 413.

Close/Cancel

When the user has completed the task of specifying how one or several user-defined options apply to the OAC, the user can either close the Option Applicator Dialog Box 400, or continue working with another OAC.
- If the user's choice is to close the Option Applicator Dialog Box 400, then the user can use conventional means such as the pointing device 105 to click on the "Done" push-button 403, or on the "Cancel" push-button 405. The resulting effect is that the Option Applicator Dialog Box 400 is closed on the display device 106.
- If the user's choice is to continue working with another OAC, the user must first change the current OAC. For this purpose the Option Applicator Dialog Box 400 contains a "Change Selection" push-button 402 which can be clicked on by the pointing device 105. When done, the user can use the same pointing device 105 to select within the spreadsheet a cell which becomes the new OAC.

Current Selection

To visualise at any time which OAC is being handled, the Option Applicator Dialog Box 400 contains a "Current Selection" text box 401 which displays the address of the current OAC. Each time a new OAC is selected according to the means described above, the "Current Selection" text box 401 is updated to show the address of the new OAC.

The fourth step occurs when the spreadsheet user decides, based on his or her own criteria not detailed here, whether a given range comprising cells with user defined options, must be either copy-pasted or cut-pasted onto another range of cells where these user-defined options are not necessarily visible.

General Process

First of all, the spreadsheet user relies on conventional spreadsheet tools to specify the source range of cells, as well as the type of the desired operation. This can be done for instance by clicking with the pointing device 105 on a dedicated push button after having selected also with the pointing device 105 the source range. This can also be performed thanks to short cuts on the keyboard 104.

Then the spreadsheet user must specify where to paste the source range; this is conventionally done on the currently selected spreadsheet cell that the user can select with conventional tools such as the pointing device 105 or the keyboard 104.

Figure 6:
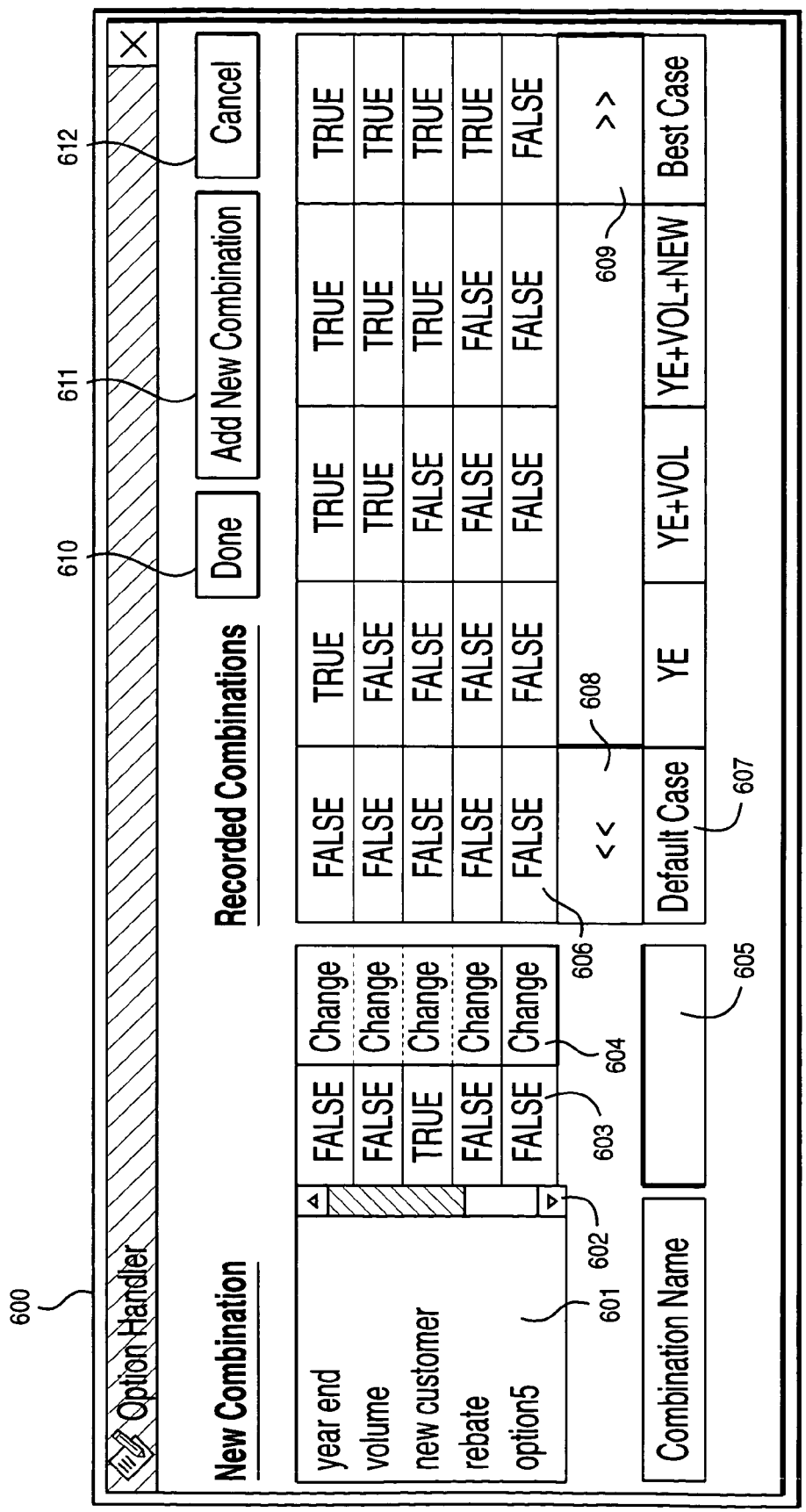
FIG. 6 illustrates a preferred spreadsheet user interface for handling user-defined options during a copy and paste or a cut and paste operation, according to the present invention.

Finally the user invokes a specific command called "Option_Handler" thanks to conventional means available in spreadsheet environment, such as (but not limited to) dedicated push-buttons, keyboard entry short cuts, menu or sub-menu entries. This result in displaying on the display device 106 of an Option Handler Dialog Box 600, as shown by FIG. 6.

Option Handler Dialog Box

The Option Handler Dialog Box 600 allows the spreadsheet user to specify the user-defined option's combinations which he/she desires to paste within the destination range. For this purpose, several objects are available within the Option Handler Dialog Box 600. They can be used according to the typical following scenario.

User-Defined Options

Within this Option Handler Dialog Box 600, the user can visualise already defined options in a "List Box" 601 (such as the ones named "year end", "volume", "new customer" and "rebate" as shown in FIG. 6). To visualise any other user defined options possibly not displayed within the list box 601 of the Option Handler Dialog Box 600, the user can for instance use the pointing device 105 to click on the scroll bar 602, so that the list box 601 can move upwards on downwards along the full set of user defined options.

Combination Definition

For each user defined option displayed within the list box 601, a label box such as 603 indicates the current status of this user defined option: either "TRUE" or "FALSE". When the spreadsheet user navigates thanks to the scroll bar 602 within the set of user defined options, the values displayed within the label boxes such as 602 are automatically updated. If the spreadsheet user wishes to modify one of these values, then he /she can use the pointing device 105 to click on the push-button such as 604 so that the value taken by the user defined option, as displayed in the label box 603 toggles between "TRUE" and "FALSE". This operation can be repeated in sequence for each of the user defined options.

Combination Name

When the spreadsheet user has completed to update the values of the different user defined options thanks to the list box 601, the scroll bar 602, the label boxes such as 603 and the push-buttons such as 604, then he/she must give a name to the combination of user defined options he/she has just specified. For this purpose, the spreadsheet user can use the keyboard 104 to enter in the window 605 the name of this user defined option selection. When this step is reached, the spreadsheet user has created and named a combination of user defined options.

Combination Validation

To validate and record this combination, the spreadsheet user uses the pointing device 105 to click on the push-button 611. The user can then visualise this newly specified user defined combination as a recorded combination whose name is displayed within a label box such as 607 and which corresponds to a set of user defined option settings as shown in label boxes like 606. If some of the available user defined options are not displayed in the list box 601 (so that the corresponding settings are not displayed in label boxes such as 606), then the spreadsheet user can use the pointing device 105 to click on the scrolling bar 602 so that the list box 601 scrolls up or down within the full set of available user defined options, and the associated label boxes such as 606 display the corresponding user defined option settings of the combination.

Multiple Combinations

If the user wishes to record more than a single user defined option combination, he/she must repeat the preceding steps, that is updating the option settings thanks to the list box 601, the scroll bar 602, then label boxes such as 603 and the push-buttons such as 604, then naming a new user defined option combination thanks to the window 605 and finally validating and recording the new user defined option combination thanks to the push-button 611. If the spreadsheet user specifies more combinations than what the Option Handler Dialog Box 600 can show in label boxes such as 606 and 607, the spreadsheet user can navigate within the set of specified combinations by clicking with the pointing device 105 on the push-button "<<" 608 or on the push-button ">>" 609. This will result in scrolling horizontally (to the left if the push button "<<" 608 is hit, and to the right if the push button ">>" 609 is hit) among the set of defined combinations of user defined options.

Combination Name Checking

Each time a new combination of user defined option is added by the spreadsheet user, the system checks that the name given for the new combination does not duplicate another name already specified. If it is the case, then the spreadsheet user is alerted thanks to conventional means (such as for instance the displayed of an error pop-up window on the display device 106) so that he/she can replace the faulty name by a valid one.

Cancel Operation

At any time during the preceding scenario, the spreadsheet user can cancel the current operation by clicking with the pointing device 105 on the push-button "Cancel" 612. This will result in closing the Option Handler Dialog Box 600 and aborting the current process of handling user defined options during the copy/cut-paste operation.

Copy-Cut Paste Operation

Alternatively, when all the combinations have been specified by the spreadsheet user, then he/she can click with the pointing device 105 on the push-button "Done" 610 to let the system perform the copy/cut-paste operation according to the present invention. When the push-button "Done" 610 has been pushed, the Option_ Handler command realises the copy/cut-paste operation according to the user's choice, as specified thanks to the various fields of the Option Handler Dialog Box 600. This operation consists in creating, for each user-defined option combination selected by the user, a version of the target range of cells, which will hold the content of the source range of cells. The underlying method followed to perform this operation is described in the next following.

C. Option_Handler Method

Figure 8:
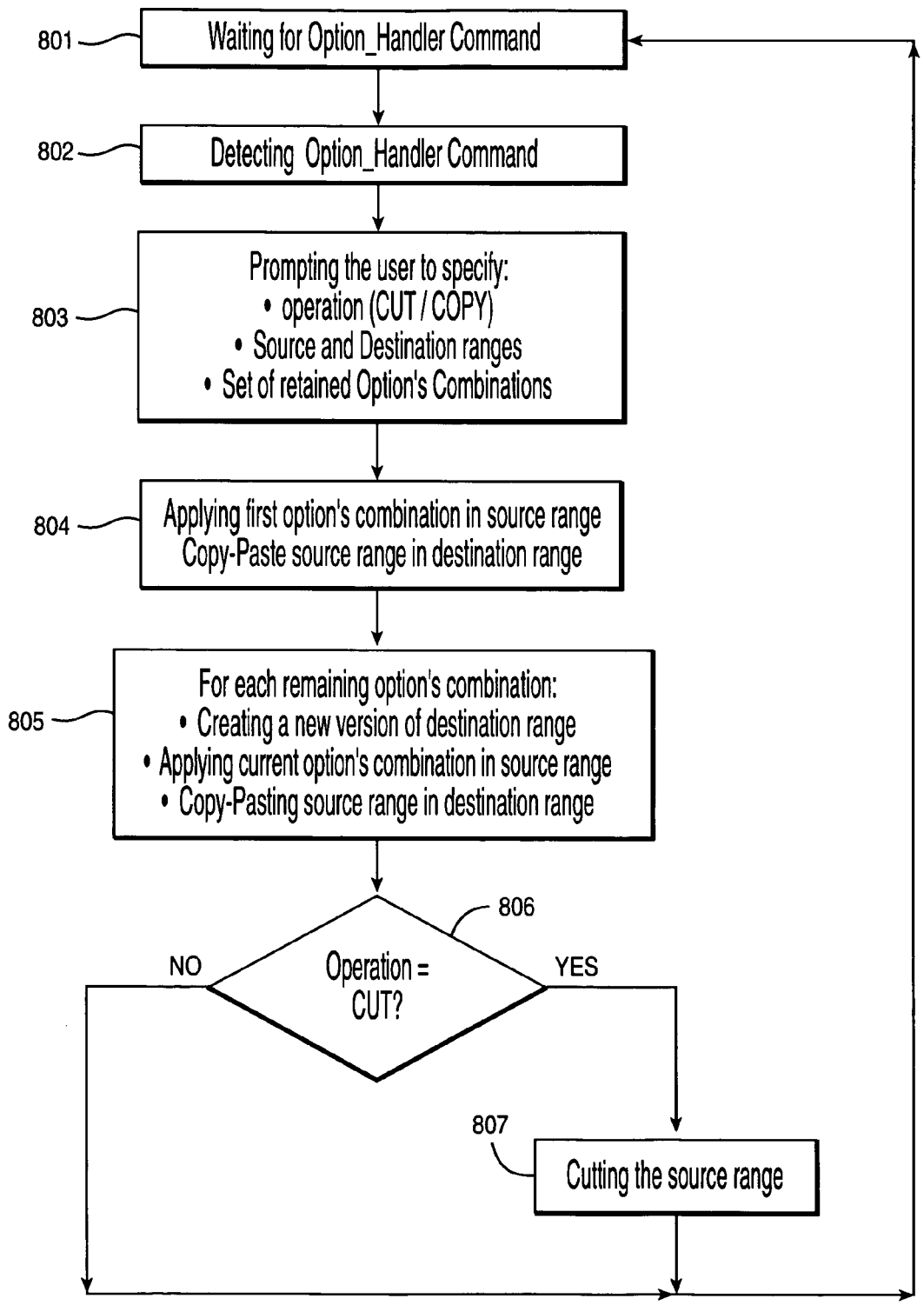
FIG. 8 is a simplified flow chart illustrating the method according to the present invention.

The method for handling user-defined options during a copy/cut-paste operation. is summarised in FIG. 8:

At step 801, the method is waiting for a Option_Handler command.

At step 802, an Option_Handler command is detected.

At step 803, the spreadsheet user enters the parameters of the copy/cut-paste operation:

the nature of the operation (cut and paste or copy and paste)

the name or address of the source range of cells and of the destination range of cells.

the set of user-defined option combinations that must be recorded within the destination range.

At step 804, the first combination of user-defined options is applied within the source range which is copy-pasted in the destination range.

At step 805, for each potentially remaining combination of user-defined options, a new version of the destination range is created, then the current combination of user-defined options is applied within the source range. Finally the source range is copy-pasted to the destination range.

At step 806, if the operation type is a cut, then control is given to step 807, otherwise control is given back to the initial step 801 for processing any future Option_Handler command.

At step 807, the source range is cut and then control is given to step 801 for processing any future Option_ Handler command.

Figure 7A:
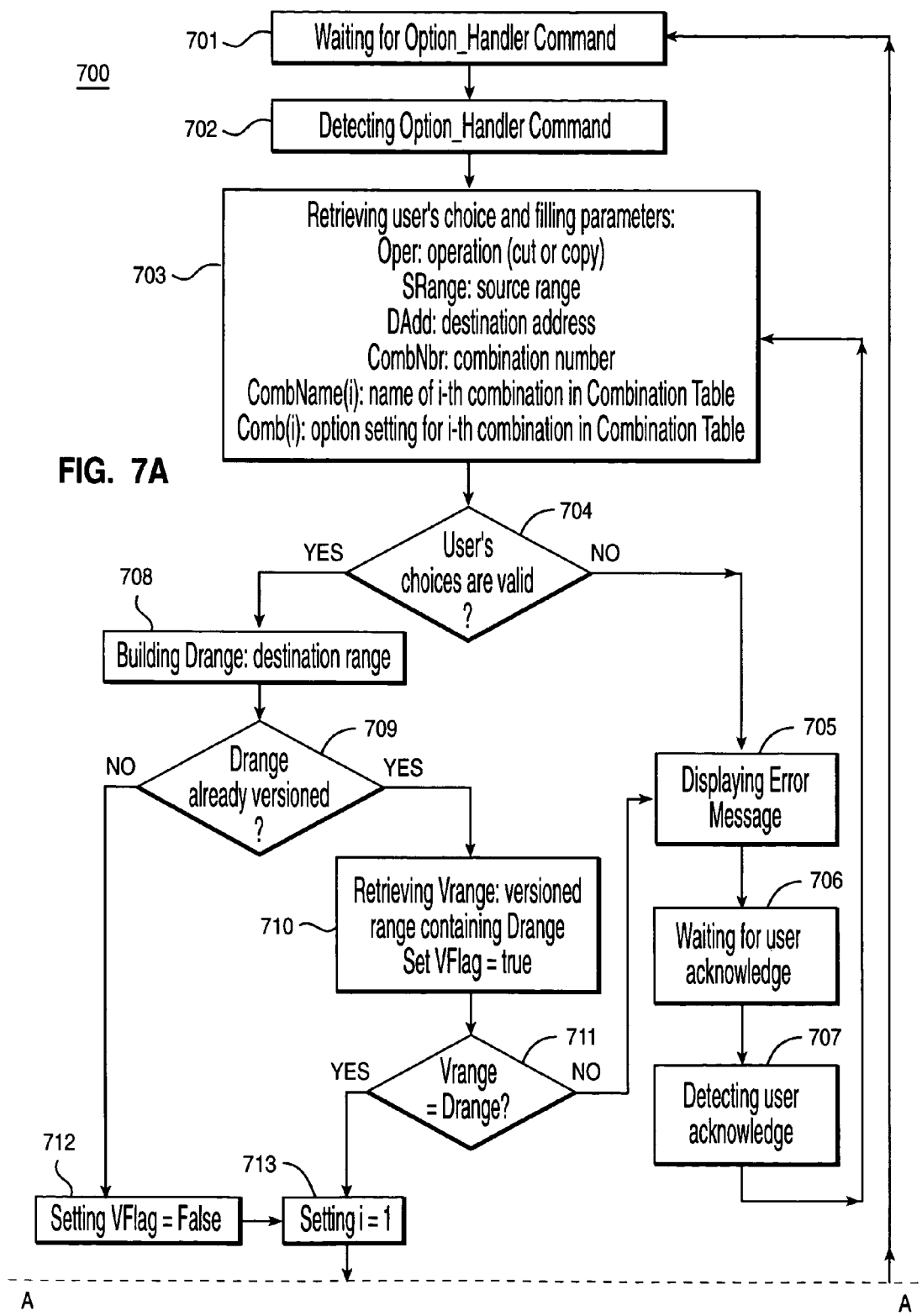
FIG. 7 is a flow chart illustrating a preferred method for handling user-defined options during a copy and paste or a cut and paste operation, according to the present invention.
Figure 7B:
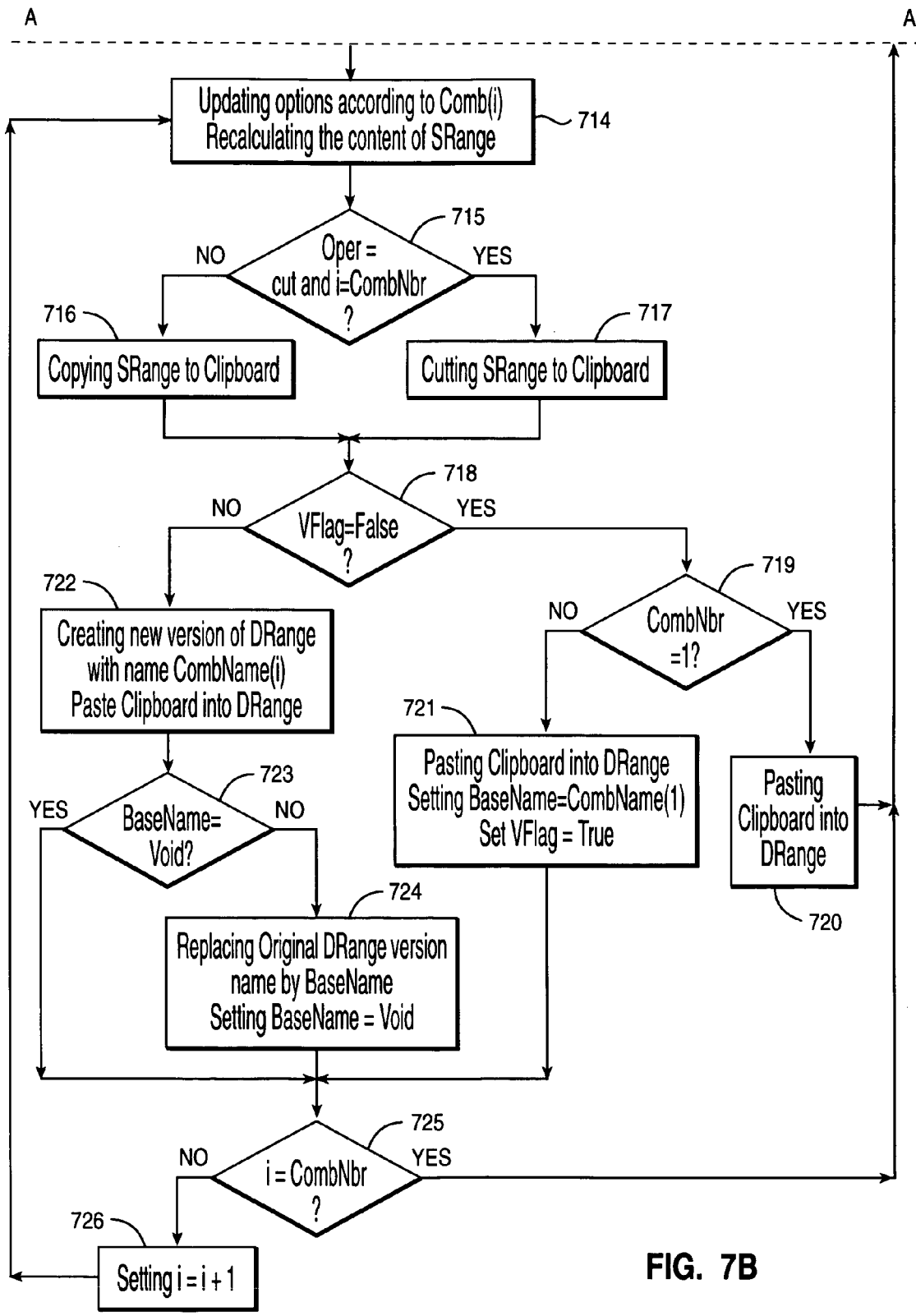

The method for handling user-defined options during a copy/cut-paste operation to take advantage of the present invention is detailed in flowchart 700 of FIG. 7. This method can be seen as the processing of the Option_Handler command. The method comprises the following steps At step 701, the method is in its default state, waiting for an event to initiate the process.

At step 702, an event is detected, as a result of a user action. This action can be for instance a specific combination of key on the keyboard 104, or the click of the pointing device 105 on a specific button, or any other similar means not further specified here.

At step 703, the parameters of the operation, as specified by the spreadsheet user, are first retrieved and then memorised in internal variables. The process of retrieving the user choice can be based on the display on the display device 106 of a dialog box such as the Option Handler Dialog Box 600 as previously described, but can also be based on other means without departing from the spirit of the current invention. In a preferred embodiment of the present invention, the process of memorising the operation parameters consists in initialising in the main memory 102 a set of variables, as follows:

The variable "Oper" specifies if the desired operation is a copy-past operation, or a cut-paste operation.

The variable "SRange" specifies the source range of cells. This source range can be either a range constituted by a single cell or a range constituted by multiple cells, and the "SRange" variable is either the address of the source range or its name in the case the source range is a named range.

The variable "DAdd" specifies the address (or the name if exists) of the destination range cell. This destination range cell must be a single cell range.

The variable "CombNbr" specifies the number of combinations that the user wishes to get pasted in the destination range.

The other variables are part of a table called the "CombinationTable" 500 which is structured according to FIG. 5. This table is constituted by a set of records 501, each of them being constituted by three fields:

An Index field 502 (referred to as "i") allowing to uniquely identify a record 501 within the CombinationTable 500.

A Combination Name field 503 (referred to as "CombName(i)") for recording the name of the i-th combination within a record 501.

A Combination field 504 (referred to as "Comb(i)") for recording the values (either 'TRUE' or 'FALSE') of the various user-defined options part of the i-th combination within the record 501. The way to encode the value of each user-defined option in the field "Comb(i)" 504 is implementation dependent and is not further described here.

At step 704, the method checks if the parameters first retrieved from the spreadsheet user and then memorised during the step 706, are valid. The validity criteria are not described here and can take different forms, according to implementation constraints. As an example, the validity checking will ensure that a given combination name, as recorded in the variable CombName(i) 503 does not appear in multiple records 501 of the CombinationTable 500. If the output of this validity checker is positive (the user's choices are valid), then control is given to step 708; otherwise control is given to step 705.

At step 705, an error display message is displayed on the display device 106 to alert the spreadsheet user of the failure of the validity check, as performed in step 704.

At step 706, the method is in a waiting state, waiting for the user to acknowledge the message displayed during the previous step.

At step 707, the method detects the user acknowledge to the message displayed during the step 705; control is then given to step 703, to let the spreadsheet user correct his/her choice.

At step 708, the method builds the full destination range, referred to as "Drange". This range of cells is determined by having (in the case of a three dimensional spreadsheet) the top/left/foreground cell set identical to the cell identified by the variable "DAdd", and by having a number of rows/columns/sheets identical to those of the range of cells identified by the variable "SRange". It is this range of cells "Drange" which will later receive as many versions as selected combinations of user-defined options.

At step 709, a test is performed to check if the "Drange" range of cells contains at least one versionned cell or not. If it is the case, then control is given to step 710; otherwise control is given to step 712.

At step 710, a new range, referred to as "Vrange" is constructed. This range of cells corresponds to the versionned range containing the versionned cell found during the test perform at step 709. Such a versionned range exists as soon as a versionned cell has been found. In addition, a local variable, referred to as "VFlag" is set equal to the value "true". This variable will be later used to record the fact that the destination range is already versionned.

At step 711, a test is performed to determine if the range of cells "Vrange" is identical or not to the range of cells "Drange". If it is the case, then it means that the versionned cell found during the test performed at step 709 has been versionned because the range of cells "Drange" has been versionned. In this alternative, control is given to step 713. If the ranges of cells "Vrange" and "Drange" are not found identical, then the versionned cell found during the test performed at step 709 has been versionned because a range different from "Drange" has been versionned. To avoid mixing different versions on partially overlapping ranges of cells, the method treats this condition as an unvalid one. As a result control is given to step 705 for alerting the spreadsheet user about this situation.

At step 712, a local variable, referred to as "VFlag" is set equal to the value "false". This variable will be later used to record the fact that the destination range is not yet versionned.

At step 713, a local variable referred to as "i", is initialised to the default value 1. This variable will be used in the following steps as an index counting the different user-defined option combinations, and indexing the records 501 within the CombinationTable 500.

At step 714, the CombinationTable 500 is scanned to get the record 501 whose index field 502 matches the variable "i". The corresponding user-defined option combination found in the field "Comb (i)" 504 is then applied in the spreadsheet (every user-defined option is updated according to the value it takes in the field "Comb(i)" 504) and the "SRange" source range of cells is recalculated so that each cell it contains gives a value corresponding to the current user-defined option combination.

At step 715, a test is performed to check if the current operation, as recorded in the variable "Oper" corresponds to a cut-paste operation, and if the value taken by the variable "i" is found equal to the value of the variable "CombNbr". If it is the case (meaning that the last combination of a cut-paste operation is currently being treated), then control is given to step 715; otherwise control is given to step 716.

At step 716, the "Srange" range of cells is copied to the clipboard, by using conventional means available in electronic spreadsheets. Then control is given to step 718.

At step 717, the "Srange" range of cells is cut to the clipboard, by using conventional means available in electronic spreadsheets. Then control is given to step 718.

At step 718, a test is performed to check if the local variable "VFlag" has a value equal to "False". If it is the case, then control is given to step 719; otherwise control is given to step 722.

At step 719, a test is performed to check if the number of user-defined option combinations, recorded in the variable "CombNbr" is found equal to 1. If it is the case, then control is given to step 720; otherwise control is given to step 721.

At step 720, the clipboard is pasted from the clipboard to the "Drange" destination range of cells by using conventional means available in electronic spreadsheets. Here the method is treating the case where a single combination of user-defined options has been selected by the spreadsheet user and where the destination range was not previously versionned: in such a situation, it is not necessary to build different versions of the destination range. Then control is given to the initial step 701 for treating any future Option_Handler command.

At step 721, the clipboard is pasted from the clipboard to the "Drange" destination range of cells by using conventional means available in electronic spreadsheets. Then a local variable "BaseName" is initialised with its value set to the value of the field 503 "CombName(1)" found in the first record 501 of the CombinationTable 500. As the destination range of cells "DRange" is not yet versionned, it is not possible to set a version name for the current combination. This will be done later, when the range of cells "DRange" will become versionned, by using the name memorised in the local variable "BaseName". Then the local variable "VFlag" is set to the value "True" to reflect the fact that the "Drange" range of cells will be versionned.

At step 722, a new version of the "DRange" range of cells is created. The name given to this version corresponds to the combination name field 503 "CombName(i)" found in the current record 501 of the CombinationTable 500. This new version becomes the current one for the "DRange" range of cells where is pasted the content of the clipboard by using conventional means available in electronic spreadsheets. If it is the first time a version is created for the destination range of cells "DRange", then conventional spreadsheets allocates a default name (such as "Base") to the version corresponding to the content of the range before it gets versionned.

At step 723, a test is performed to check if the local variable "BaseName" is void (empty) or instead contains a name (potentially initialised at step 721). If the local variable "BaseName" is found void, then control is given to step 725, otherwise control is given to step 724.

At step 724, the default name of the version corresponding to the original values initialised in the destination range of cells "DRange" is replaced by the name memorised in the local variable "BaseName" at step 721. Then this local variable "BaseName" is reset to void to prevent to rename again the original version of the destination range of cells "DRange".

At step 725, a test is performed to check if the local variable "i" is found equal to the variable "CombNbr". If it is the case (meaning that all the combinations have been treated), then control is given to the initial step 701 for handling any future Option Handler command. If it is not the case, then control is given to step 726.

At step 726, the local variable "i" is incremented by 1 to reflect the fact that the next combination of user-defined options will be treated by the steps starting with step 714 to which control is given.

Alternate Embodiments

While the invention has been particularly shown and described with reference to a preferred embodiment, it will be understood that various changes in form and detail may be made therein without departing from the spirit, and scope of the invention.

The Option_Handler method and system according to the present invention may be used advantageously in those environments where elements of information are organised as multidimensional tables having more than three dimensions.

The Option_Handler method and system according to the present invention may be used advantageously in those cases where the source range of cells is either copy-pasted or cut-pasted to multiple destination ranges of cells during a single operation.

What is claimed is:

1. A method, implemented on a computer system, of handling user-defined options during a copy and paste operation or a cut and paste operation within a multi dimensional electronic spreadsheet comprising a plurality of cells identified by a cell address along each dimension, said method comprising the steps of:

processing a first user input, wherein the first user input defines one or a plurality of option combinations, each option combination comprising a plurality of options, wherein each option in the plurality of options has an associated identifier and an associated value;

accessing, in the computer system, the multidimensional electronic spreadsheet, wherein the multidimensional electronic spreadsheet includes at least one cell that references an identifier of at least one option of the plurality of options;

processing a second user input, wherein the second user input selects a first source cell range of the multidimensional electronic spreadsheet and a destination cell range of the multidimensional electronic spreadsheet;

processing a third user input identifying an operation to execute, wherein the operation to execute is either a copy and paste operation, or a cut and paste operation; and performing the identified operation, wherein performing the identified operation comprises:

analyzing the first source cell range, for each defined option combination, to determine if at least one cell in the first source cell range comprises a reference to one or more options of the plurality of options of the defined option combination; and for each option combination in which the first source cell range has at least one cell that references one or more options of the plurality of options of the defined option combination, performing the following operations:

computing a content of each cell within the first source cell range to thereby generate a second source cell range, wherein contents of the at least one cell are computed according to the referenced one or more options of the plurality of options based on a corresponding value associated with the referenced one or more options defined in a current option combination;

creating a version instance of the destination cell range in the multidimensional electronic spreadsheet; and copying the second source range of cells into the version instance.

2. The method according to claim 1, wherein processing the first user input comprises assigning a name for each defined option combination, and wherein a version instance associated with the option combination is named using the defined option combination name.

3. The method according to claim 1, further comprising the preliminary steps of:

defining each option of the plurality of options as a Boolean variable in an options data structure; and referencing at least one option of the plurality of options in one or a plurality of cells of the multidimensional electronic spreadsheet.

4. The method of claim 3, wherein referencing at least one option of the plurality of options in one or a plurality of cells of the multidimensional electronic spreadsheet comprises:

selecting a cell from the plurality of cells of the multidimensional electronic spreadsheet; and outputting an interactive user interface for applying one or more options of the plurality of options to the selected cell, wherein the interactive user interface includes a field for specifying an option to apply to the selected cell and a field for identifying a logical operation for applying the specified option to the selected cell.

5. The method of claim 4, wherein the logical operation is selected from the set of logical operations including an Add logical operation meaning that the specified option is applied with an additive effect, a Multiply logical operation meaning that the specified option is applied with a multiplicative effect, and an Or logical operation meaning that the specified option is applied with an exclusive effect.

6. The method according to claim 1, wherein one or more of the first user input, the second user input, or the third user input are received in the computer system by means of an interactive user interface.

7. The method according to claim 6, wherein the interactive user interface comprises:
a dialog box displayed on a screen of the computer system.

8. The method of claim 1, further comprising:
outputting an interactive user interface through which the first user input is received, wherein the interactive user interface including a first portion for displaying a listing of defined options that are able to be referenced in cells of the multidimensional electronic spreadsheet, and a second portion for specifying option combinations by specifying values for a plurality of the defined options in the first portion.

9. The method of claim 1, wherein each of the options is defined as a Boolean variable whose value can be set as "True" or "False," and wherein values of the options impact contents of cells within the multidimensional electronic spreadsheet when the cells reference the options.

10. The method of claim 9, wherein if an option has a value of "True," the option is represented as a numerical "1" in contents of cells within the multidimensional electronic spreadsheet that reference the option, and wherein if an option has a value of "False," the option is represented as a numerical "0" in contents of cells within the multidimensional electronic spreadsheet that reference the option.

11. A system, comprising:
a processor; and
a memory coupled to the processor, wherein the memory contains instructions which when executed by the processor, cause the processor to:
process a first user input, wherein the first user input defines one or a plurality of option combinations, each option combination comprising a plurality of options, wherein each option in the plurality of options has an associated identifier and an associated value;
access, in the computer system, a multidimensional electronic spreadsheet, wherein the multidimensional electronic spreadsheet includes at least one cell that references an identifier of at least one option of the plurality of options;
process a second user input, wherein the second user input selects a first source cell range of the multidimensional electronic spreadsheet and a destination cell range of the multidimensional electronic spreadsheet;
process a third user input identifying an operation to execute, wherein the operation to execute is either a copy and paste operation, or a cut and paste operation; and
perform the identified operation, wherein performing the identified operation comprises:
analyzing the first source cell range, for each defined option combination, to determine if at least one cell in the first source cell range comprises a reference to one or more options of the plurality of options of the defined option combination; and
for each option combination in which the first source cell range has at least one cell that references one or more options of the plurality of options of the defined option combination, performing the following operations:
computing a content of each cell within the first source cell range to thereby generate a second source cell range, wherein contents of the at least one cell are computed according to the referenced one or more options of the plurality of options based on a corresponding value associated with the referenced one or more options defined in a current option combination;
creating a version instance of the destination cell range in the multidimensional electronic spreadsheet; and
copying the second source range of cells into the version instance.

12. The system according to claim 11, wherein the instructions further cause the processor to assigning a name for each defined option combination, and wherein a version instance associated with the option combination is named using the defined option combination name.

13. The system according to claim 11, wherein the instructions further cause the processor to:
define each option of the plurality of options as a Boolean variable in an options data structure; and
reference at least one option of the plurality of options in one or a plurality of cells of the multidimensional electronic spreadsheet.

14. The system of claim 13, wherein the instructions cause the processor to reference at least one option of the plurality of options in one or a plurality of cells of the multidimensional electronic spreadsheet by:
selecting a cell from the plurality of cells of the multidimensional electronic spreadsheet; and
outputting an interactive user interface for applying one or more options of the plurality of options to the selected cell, wherein the interactive user interface includes a field for specifying an option to apply to the selected cell and a field for identifying a logical operation for applying the specified option to the selected cell.

15. The system of claim 14, wherein the logical operation is selected from the set of logical operations including an Add logical operation meaning that the specified option is applied with an additive effect, a Multiply logical operation meaning that the specified option is applied with a multiplicative effect, and an Or logical operation meaning that the specified option is applied with an exclusive effect.

16. The system according to claim 11, wherein one or more of the first user input, the second user input, or the third user input are received in the computer system by means of an interactive user interface.

17. The system of claim 11, wherein the instructions further cause the processor to:
output an interactive user interface through which the first user input is received, wherein the interactive user interface including a first portion for displaying a listing of defined options that are able to be referenced in cells of the multidimensional electronic spreadsheet, and a second portion for specifying option combinations by specifying values for a plurality of the defined options in the first portion.

18. The system of claim 11, wherein each of the options is defined as a Boolean variable whose value can be set as "True" or "False," and wherein values of the options impact contents of cells within the multidimensional electronic spreadsheet when the cells reference the options.

19. The system of claim 18, wherein if an option has a value of "True," the option is represented as a numerical "1" in contents of cells within the multidimensional electronic spreadsheet that reference the option, and wherein if an option has a value of "False," the option is represented as a numerical "0" in contents of cells within the multidimensional electronic spreadsheet that reference the option.

20. A computer usable medium having instructions recorded thereon, wherein the instructions, when executed on a computing device, cause the computing device to:

process a first user input, wherein the first user input defines one or a plurality of option combinations, each option combination comprising a plurality of options, wherein each option in the plurality of options has an associated identifier and an associated value;

access, in the computer system, a multidimensional electronic spreadsheet, wherein the multidimensional electronic spreadsheet includes at least one cell that references an identifier of at least one option of the plurality of options;

process a second user input, wherein the second user input selects a first source cell range of the multidimensional electronic spreadsheet and a destination cell range of the multidimensional electronic spreadsheet;

process a third user input identifying an operation to execute, wherein the operation to execute is either a copy and paste operation, or a cut and paste operation; and perform the identified operation, wherein performing the identified operation comprises:

analyzing the first source cell range, for each defined option combination, to determine if at least one cell in the first source cell range comprises a reference to one or more options of the plurality of options of the defined option combination, and for each option combination in which the first source cell range has at least one cell that references one or more options of the plurality of options of the defined option combination, performing the following operations:

computing a content of each cell within the first source cell range to thereby generate a second source cell range, wherein contents of the at least one cell are computed according to the referenced one or more options of the plurality of options based on a corresponding value associated with the referenced one or more options defined in a current option combination;

creating a version instance of the destination cell range in the multidimensional electronic spreadsheet; and copying the second source range of cells into the version instance.

\* \* \* \* \*